US008966097B1

(12) United States Patent
Roseman et al.

(10) Patent No.: US 8,966,097 B1
(45) Date of Patent: *Feb. 24, 2015

(54) FRACTIONAL REDUNDANT DISTRIBUTION OF MEDIA CONTENT

(71) Applicant: Amazon Technologies, Inc., Reno, NV (US)

(72) Inventors: Neil C. Roseman, Seattle, WA (US); Robert L. Goodwin, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/040,195

(22) Filed: Sep. 27, 2013

Related U.S. Application Data

(63) Continuation of application No. 11/694,885, filed on Mar. 30, 2007, now Pat. No. 8,549,150.

(51) Int. Cl.
*G06F 15/173* (2006.01)
*G06F 15/16* (2006.01)
*H04L 12/28* (2006.01)
*H04N 7/16* (2011.01)
*H04L 29/06* (2006.01)

(52) U.S. Cl.
CPC ..................................... *H04L 67/42* (2013.01)

USPC ............ 709/227; 709/201; 370/351; 725/148

(58) Field of Classification Search
None
See application file for complete search history.

(56) References Cited

U.S. PATENT DOCUMENTS

| 6,415,280 | B1 | 7/2002 | Farber et al. |
|---|---|---|---|
| 2002/0107935 | A1 | 8/2002 | Lowery et al. |
| 2002/0120925 | A1 | 8/2002 | Logan |
| 2002/0184357 | A1 | 12/2002 | Traversat et al. |
| 2003/0028610 | A1 | 2/2003 | Pearson |
| 2003/0061287 | A1 | 3/2003 | Yu et al. |
| 2006/0053209 | A1 | 3/2006 | Li |

*Primary Examiner* — Ranodhi Serrao
(74) *Attorney, Agent, or Firm* — Knobbe, Martens, Olson & Bear, LLP

(57) ABSTRACT

A method and system for a client device to download media content directly from a group of other client devices which play a role of edge servers placed by a content service provider. According to some embodiments, an end user can use his/her client device to stream or download media content from the source client devices selected based on the geographic locality, network topology, etc. The fractions of data corresponding to a portion of media content are stored on the source client devices such that only a subset of the fractions of data are needed to recreate the corresponding portion. That is, by using the first received of the minimum number of fractions to reconstruct each portion of media content, the system does not need to wait for the slowest fractions to arrive, which contributes in reducing latency.

22 Claims, 9 Drawing Sheets

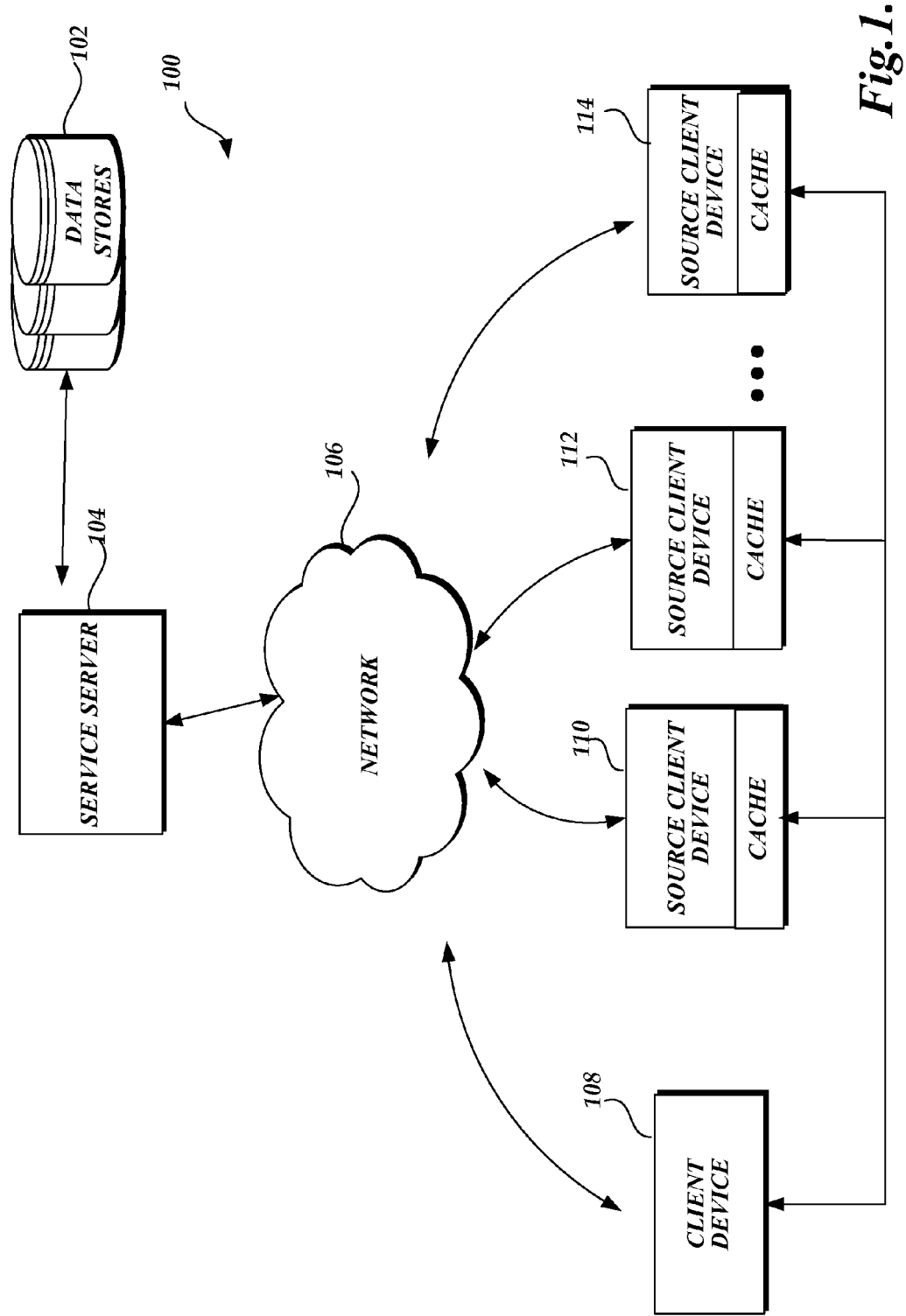

MOVIE A

230

| | | | | |
|---|---|---|---|---|
| | DEVICE 1 | BLOCK A1 | BLOCK B2 | BLOCK C3 |
| | DEVICE 2 | BLOCK A2 | BLOCK B3 | BLOCK C4 |
| | DEVICE 3 | BLOCK A3 | BLOCK B4 | BLOCK C1 |
| | DEVICE 4 | BLOCK A4 | BLOCK B1 | BLOCK C2 |
| | DEVICE 5 | BLOCK A1 | BLOCK B2 | BLOCK C3 |
| | DEVICE 6 | BLOCK A2 | BLOCK B3 | BLOCK C4 |
| | ⋮ | | | |
| | DEVICE M+1 | BLOCK A1 | BLOCK B4 | BLOCK C1 |
| | DEVICE M+2 | BLOCK A2 | BLOCK B1 | BLOCK C2 |
| | DEVICE M+3 | BLOCK A3 | BLOCK B2 | BLOCK C3 |
| | DEVICE M+4 | BLOCK A4 | BLOCK B3 | BLOCK C4 |

*Fig.2B.*

FRACTIONAL REDUNDANT DISTRIBUTION OF MEDIA CONTENT

BACKGROUND

As the popularity of the Internet increases, users who want to receive media content over the Internet and content providers who offer such services exponentially grow. Most media content files, such as movie files, including video and audio information tend to be large, which can cause a delay (lag) problem for streaming or downloading the media content files. Further, the growing number of users along with the growing number of content providers is causing congestion, latency, and other problems in the Internet. The congestion and latency problems are particularly critical for media content files that should be delivered in a real time or near real time sequence. For example, a movie on demand service allowing a user to watch a movie over the Internet should deliver a stream of movie data (a media content file) in near real time sequence in order not to disturb the smooth playing of the movie.

In order to mitigate the above-mentioned problems, some content providers distribute several copies of media content files of media content to servers that are located in close proximity to user devices, i.e., a few hubs of connections away from the user devices. These servers may be placed at a location known as the "edge" of the network, and thus may be called "edge servers." Typically, user devices that are located "beyond" the edge of the network communicate with the edge servers over the Internet. After the media content file is distributed amongst edge servers, the media content file becomes available from multiple edge servers that are located in different geographical localities on the network, such as the Internet. In this manner, media content files are pushed to the edge of the network where user requests may be served from one of multiple edge servers, usually from the geographically closest edge server. Thus, the media content files can travel a relatively short distance (from the edge server to the user device).

However, the current approach having edge servers may not solve the above-mentioned problems because of, among other reasons, the inherent problems in delivering media content files over the Internet. For example, insufficient capacity on a particular communication link, slow processing speed of networking equipment, and latency in the Internet because of the time associated with data traveling over long distances may still exist as long as the user devices and the edge servers are communicating over unknown paths in the Internet.

Further, the delivery of media content from an edge server to user devices can place a heavy load on the network that can result in lost data. For example, when data is sent across the Internet, the user device may not receive all of the data transmitted from the edge server. This is because, for example, the media content may pass through some routers where some data packets of the media content file may be dropped due to congestion. In some cases, dropped packets can slow or halt the delivery of media content because, as more data is resent to recover the dropped packets, routers can become more congested and thereby drop more packets.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a method for distributing media content to a client device from a group of other client devices which have been defined as source client devices is provided. The method comprises receiving from the service provider information about the group of source client devices and establishing a peer-to-peer communication connection with each source client device. Upon establishment of the peer-to-peer communication connection, the client device downloads media fractions or blocks from each source client device. The media content has been divided into several media fractions which in return have been distributed by the service provider among the group of source client devices. The source client device includes a cache memory component for storing the distributed media fractions. A playable portion of the media content is constructed after the client device receives a subset of media fractions corresponding to the playable portion. The subset of media fractions are the minimum media fractions necessary to produce the playable portion.

In accordance with another aspect of the present invention, a method for a service server to provide media content to a user through a group of source client devices is provided. The method comprises retrieving an index table associated with particular media content which was requested by a client device, identifying a group of source client devices and providing the client device with the information about the group of source client devices. Each of the source client devices stores one or more portions of the particular media content in the form of media fractions. The obtained index table includes information about the distribution of the media fractions among the group of source client devices. The group of source client devices collectively store media fractions corresponding to a playable portion of the instance of the media content. Only a subset of the stored media fractions is required to produce the playable portion of the instance of the media content. In an aspect of the method, only the media fraction delivered most quickly is used, providing an overall decrease in latency.

In accordance with yet another aspect of the present invention, a computer system is provided for enabling a client device to receive media content through a group of source client devices. The computer system comprises several data stores for storing media content and information about several groups of source client devices. The computer system also comprises a computing device in communication with the data stores. The computing device receives from a client device a request for media content and obtains mapping information associated with the media content. Based on the mapping information, a group of source client devices are identified for fulfilling the request. Each source client device that is included in the identified group stores media fractions of the media content. The mapping information includes information about distribution of the plurality of media fractions related to the media content among the group of source client devices. The computing device verifies the request and issues an authorization to access the identified group of source client devices. The computing device provides the client device with the information about the identified group of source client devices and the authorization.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram of an illustrative operating environment including a number of data stores, a service server, and several source client devices facilitating a service for media content in accordance with an aspect of the present invention;

FIG. 2B is a pictorial diagram illustrating several index tables reflecting mapping information between media blocks and source client devices in accordance with an aspect of the present invention;

DETAILED DESCRIPTION

Figure 2A:
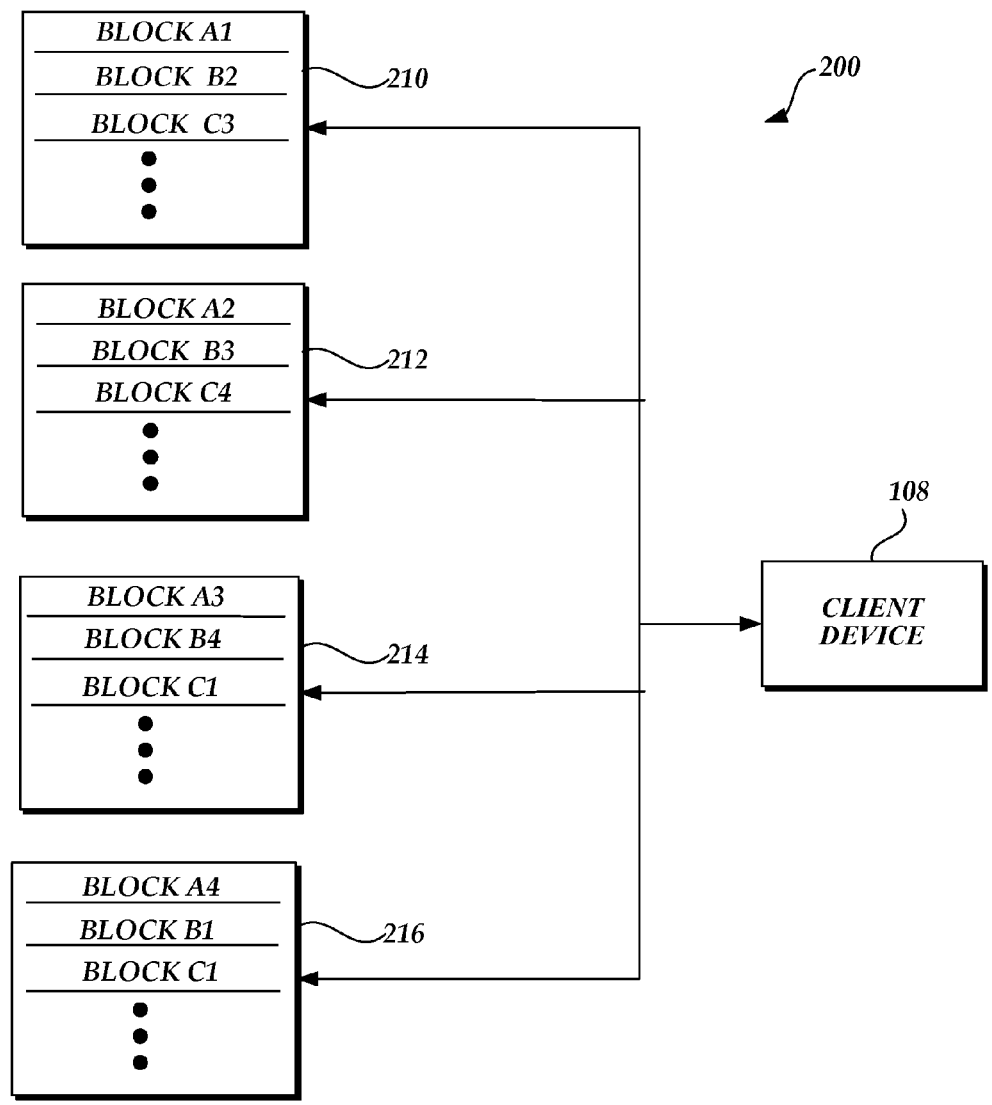
FIG. 2A is a block diagram of several source client devices connected to a client device for transmitting media blocks in accordance with an aspect of the present invention.

The following detailed description describes exemplary embodiments of the present invention. Although specific system configurations and flow diagrams are illustrated, it should be understood that the examples provided are not exhaustive and do not limit the present invention to the precise forms and embodiments disclosed. It will be apparent to one skilled in the art that the invention may be practiced without some or all of these specific details. In other instances, well-known process steps have not been described in detail in order not to unnecessarily obscure the invention.

It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

Generally described, embodiments of the present invention are related to a method and system for a client device to receive media content directly from a group of other client devices which are defined as source client devices. As described below, a client device may also be a source client device for another client device. The source client devices may be implemented as small scale servers of a content service provider. More specifically, a user can use his/her client device to stream or download media content from source client devices that are logically grouped together, such as, for example, those located in a similar geographic locality.

According to some embodiments, an instance of media content to be delivered to a client is divided into portions, which are segments of logically sequential data. In this respect, the portions are also referred to herein as stripes. Each portion is further divided into several fractions of data. As is known in a variety of redundant data schemes, the fractions of data can be stored along with parity information or have other mathematical relationships such that only a subset of the fractions of data are needed to recreate the entire portion.

Accordingly, a group of source client devices are selected by the content service provider, each of which stores fractions of the media content that collectively make up an entire instance of media content. During a downloading process, the portions of the media content are delivered from the group of source client devices to a receiving client device via delivery of the fractions of the media content. Because of the redundancy, the receiving client device can construct each portion using only a subset of all the fractions in a particular potion. That is, the receiving client device can construct the entire portion using the first N fractions to arrive, where N is the minimum number of fractions needed to reconstruct the entire portion. Because not all data is needed to construct the portion, only the data delivered most quickly is used, providing an overall decrease in latency. Further, the portion of the instance of media content is small in size compared to the entire instance of media content, which also contributes in reducing latency or congestion. Not only does the redundancy of the data result in lower latency, such an approach also guards against failure of one or more source client devices and/or intermediary network connections.

With reference now to FIG. 1, an illustrative operating environment 100 can include a content service server (hereinafter "service server") 104 for providing and distributing instances of media content which are initially stored in one or more data stores 102 or which are received from third party content providers (not shown). Some instances of media content stored in the data store or received (e.g. streamed, etc.) from other sources may be divided into portions (e.g., stripes). These portions are further divided into fractions (hereinafter "media blocks") and distributed amongst source client devices 110-114 which are configured to facilitate services for users. The service server 104 may determine which source client device will store which media blocks of particular media content. A source client device 110-114 may be a conventional user device which has limited user programmable functionality while capable of streaming instances of media content from the service server 104 to users. The source client device 110-114 is configured to receive and store media blocks of an instance of media content in memory and to deliver the media blocks of the instance of the media content to other client devices upon request. For example, a source client device 110-114 may be a Digital Home Communication Terminal (DHCT) or a television Set-Top Terminal (STT) including a cache component where a plurality of media blocks are stored and quickly retrieved for fulfilling a request from a client device. As such, the service server 104 may utilize the source client devices 110-114 for providing instances of media content as if the source client device were one of the edge servers of the service server.

In one embodiment, the source client devices 110-114 may be grouped for facilitating a service for an instance of particular media content based on a geographic locality (such as a town, neighborhood) or other physical or logical proximity grouping. For example, the service server 104 may select a first group of source client devices 110-114 for serving a first town. In this example, any client devices located in the first town will be associated as a group of source client devices and communicate with the group for downloading, or streaming the particular media content. After dividing the instance of the particular media content into portions (or stripes), the service server 104 may distribute the media blocks associated with each portion to each group of source client devices. The distribution of media blocks for an instance of particular media content can be performed at once for each and every group or gradually performed based on the demand of users in the geographic locality. Once the media blocks are distributed among at least one group of source client devices, a client device 108 can receive the media blocks directly from the group of source client devices.

In one embodiment, for downloading media blocks, the client devices are connected with the source client devices 110-114 via peer-to-peer communication connections, thereby reducing latency caused by media blocks (media content data) traveling over a long path in the Internet. According to some embodiments, the media blocks only travel from one client device (a source client device) to another over a less congested path or a shorter distance path, resulting in a decrease in latency. Further, each media block downloaded from a source client device is small in size compared to the entire instance of media content, which also contributes in reducing latency or congestion. In addition, the service server 104 may maintain a load balance among groups of service client devices. For example, if there are too many requests for an instance of particular media content in one geographic area, the service server 104 may partition the geographic area into multiple areas or select an additional group of source client devices to fulfill the requests for an instance of the particular media content. In one embodiment, multiple groups of source client devices can serve one geographic area for instance of particular media content. In addition, the source client devices in the multiple groups can be regrouped by the service server. As well understood by one of ordinary skill in the art, a new source client device can be included in an existing group or a new group. Similarly, an existing source client device can be removed or become inactive from the existing group.

In an illustrative embodiment, a Redundant Array of Inexpensive Disk (RAID) concept may be implemented when the service server 104 distributes the divided media blocks amongst the source client devices 110-114. As will be well appreciated by one of ordinary skill in the art, RAID is a storage management technique commonly used in many storage subsystems. RAID technology is utilized due to the combination of parallel transfers and simultaneous responses to multiple requests and can enable the source client devices to provide a high level of performance. Although several levels of RAID technology can be implemented in conjunction with a group of source client devices, the exemplary embodiments described herein may implement RAID level 6 in the group of source client devices, maintaining first and second redundancy information to decrease latency in data delivery as well as guard against the failure of the delivery of fractions of data from two source client devices. In alternative embodiments, other RAID levels may be utilized. For example, RAID level 1 may be utilized within each group such that media data is striped with no mirroring or parity. In the event of failure/corruption of a media block, the service server 104 could resend the media block to the group or instruct the client device to obtain the media block from a source client device of another group.

Referring now to FIG. 2A, a client device 108, for example a DHCT, establishes a peer-to-peer communication channel with each source client device 210-216 based on information provided by the service server 104. As shown, the media blocks are distributed in accordance with RAID level 6. For example, "Movie A" is divided into several portions (e.g. stripes) of media blocks and distributed among four different source client devices. Referring to FIG. 2B, an exemplary index table 230 reflecting mapping information between media blocks of "Movie A" and source client devices is illustrated. As shown, several source client devices in a group store media blocks of "Movie A" in accordance with RAID level 6. "Movie A" is divided into stripes that are then divided into several media blocks. For example, the first stripe of "Movie A" includes "Block A1," "Block A2," "Block A3," and "Block A4." The second stripe of "Movie A" includes "Block B1," "Block B2," "Block B3," and "Block B4," and so on. The blocks of each stripe are distributed amongst source client devices in a group based on the mapping table 230. According to such an example, only two of the four blocks in a given stripe are needed, along with parity information, to recreate the entire stripe of media content. Thus, it can be said that for each stripe of media blocks, two redundant blocks are created and distributed among the source client devices. The redundant blocks are distributed in a manner such that any source client device in a group can store a redundant block, including the receiving client. Consequently, a receiving client can be configured to recreate the entire stripe of media content upon receiving the first two blocks, while discarding the last two blocks, if received. An improvement in latency, among other benefits, results from this approach. Further, no source client device becomes a dedicated device using such an approach. As mentioned above, the redundant blocks can be used to recover a defective media block. Thus, for example, if a first received block is defective, a receiving client may discard this block in favor of using the next two received blocks to recreate the respective stripe of media content. In addition, if there is a connection failure with one of the source client devices, the receiving client can still construct the respective stripe of media content using redundant blocks and thus no stripe of media content will be missed due to the connection failure.

For the purpose of discussion, assume that the client device 108 has requested a service for "Movie A" and the service server 104 has transmitted information identifying a group of source client devices for the requested service. The identified source client devices store at least one portion of "Movie A" in the form of media blocks. Assume further that the client device 108 establishes a peer-to-peer communication connection with each of the source client devices 210-216 in the group, but at one point a communication connection between the client device and one source client device 216 fails, is slow, or otherwise delays the delivery of its respective media blocks. In this example, the client device 108 may download a first stripe of media blocks that are available, for example "Block A1," "Block A2," and "Block A3," from source client devices 210, 212, 214, respectively. Parity information about the stripe may also be transmitted separately or with each block. In this case, assuming that Blocks A1 and A2 are received first, these blocks can be used to recreate the entire respective stripe of media content while Block A3 can be discarded. Likewise, even though Block A4 will be delayed and/or never received from client 216, client device 108 does not wait to receive this block to recreate the stripe of media content.

As mentioned above, any source client device can be used as a regular client device with which a user can navigate or request a service for media content. Thus, in some instances, one of the source client devices configured to serve a request for streaming or downloading an instance of media content can be used by other client devices for requesting a service for that instance of media content. In that case, the source client device stores media blocks of the instance of media content in its cache component. After the service server 104 provides information about the source client devices where the requested instance of media content is to be collectively received, the source client device will obtain the stored media blocks from its cache component and receive other media blocks from the rest of the group.

Figure 3A:
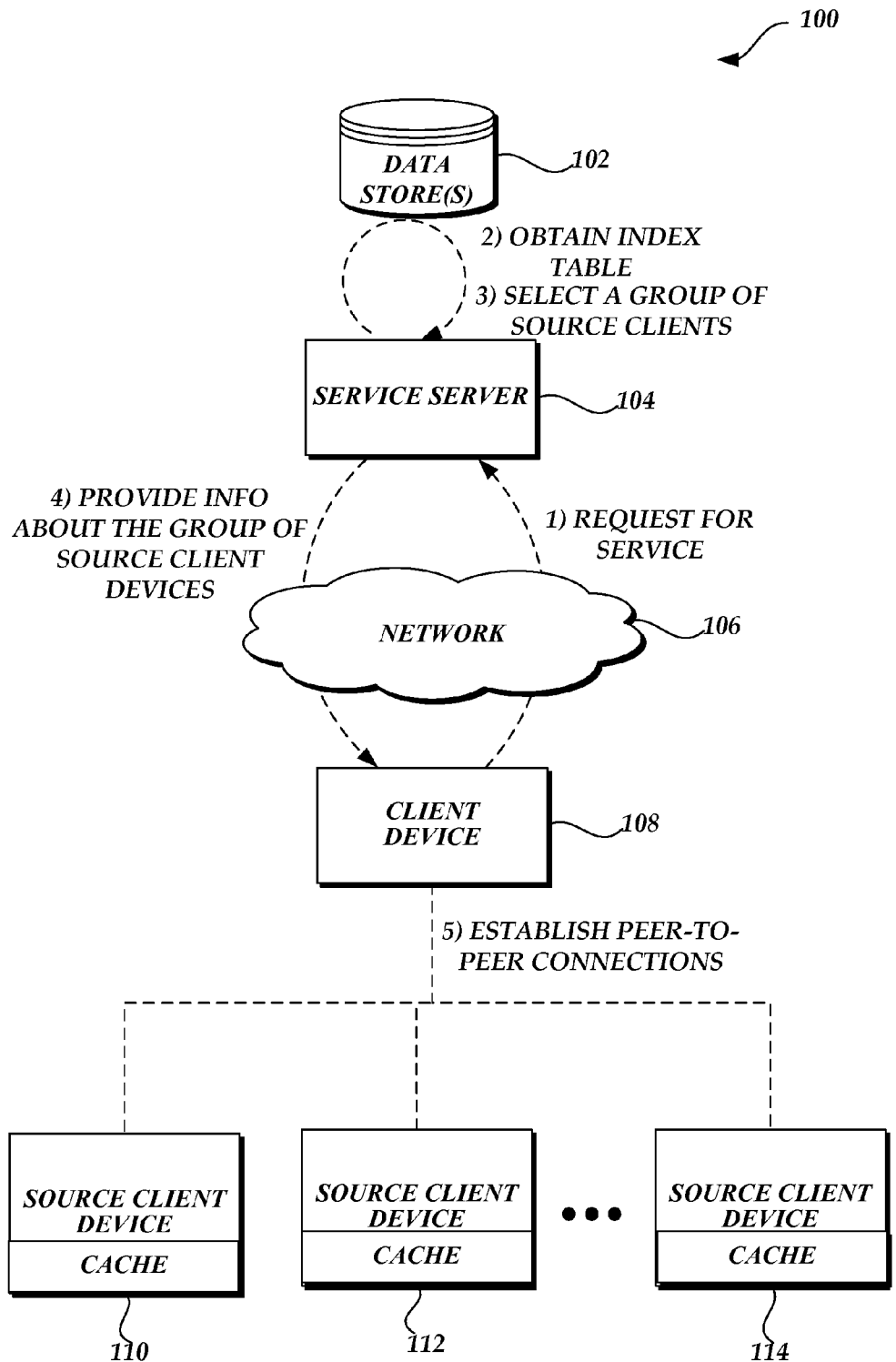
FIGS. 3A-3B are block diagrams of the operating environment of FIG. 1 illustrating interactions among various components in the operating environment where a client device receives an instance of media content collectively from a group of source client devices which have been selected by the service server in accordance with an aspect of the present invention.
Figure 3B:
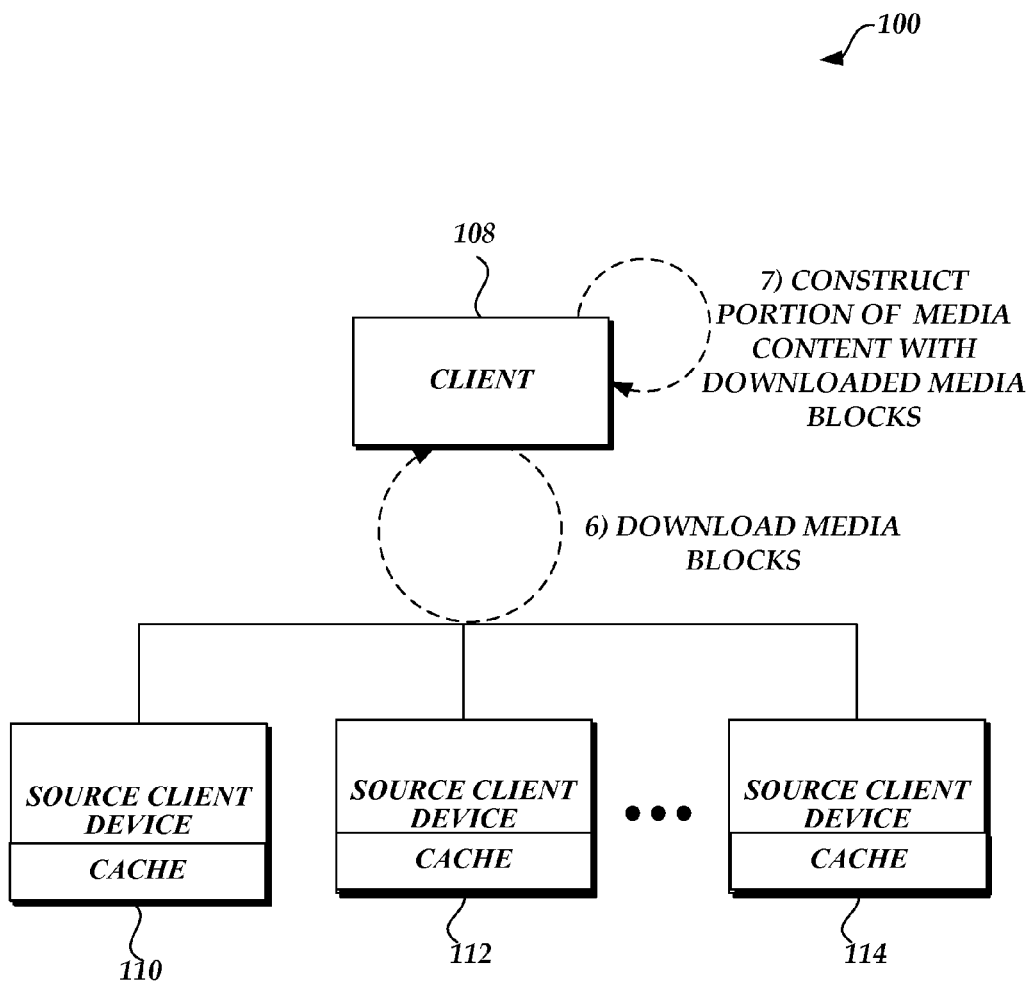

With reference now to FIGS. 3A and 3B, the interaction by various components of the operating environment 100 to provide media content services using several source client devices is described. As illustrated in FIG. 3A, a user may request a service for receiving particular media content. A client device 108 operated by the user may issue to the service server a request for streaming or downloading an instance of media content. The request for the instance of media content can be transmitted via a communications network 106, such as the Internet. A service server 104 obtains the request and then determines area group of source client devices to serve the client device. The service server 104 obtains and looks up index tables related to the requested instance of media content, the media block distribution information, etc. Subsequently, the service server 104 identifies one or more groups of source client devices which can provide the client device with media blocks that collectively constitute the requested instance of media content. Among the identified groups of source client, the server may choose a group that can most effectively facilitate the request from the client device.

For example, if a user in Seattle, Wash., selects the movie "Sound of Music" for a service, the client device 108 transmits to the service server a request for streaming or downloading the movie "Sound of Music." Then, the service server 104 obtains and looks up an index table to select a group of source client devices which store media blocks of an instance of the movie "Sound of Music" and also which are most likely to deliver content to the client 108 with the least delay. For example, the service server may select clients that are geographically or logically close, may consider loading of particular clients, and/or network congestion, among other possibilities. As mentioned above, the service server 104 distributes media blocks that collectively make up the movie "Sound of Music" among groups of source client devices. The service server 104 may create index tables or mapping tables to map media blocks and groups of source client devices.

In response to the request for streaming the instance of the media content, the service server 104 transmits to the client device 108 the information about the selected group of source clients, such as an IP address of each source client device, the media block distribution information, etc. The information about the selected group of source clients can be transmitted via a communications network 106. After the client device 108 obtains the information about the selected group of source clients, the client device 108 can establish a peer-to-peer connection with each of the source client devices in the selected group that store the desired media content in order to obtain the media blocks. In some embodiments, more than one source client 110-114 may store and attempt to forward a particular media block. Furthermore, multiple media blocks from a single stripe (e.g., Block A1, Block A2, etc.) may be transmitted from a single client 110-114. Thus, it should be understood that in some embodiments there is not a 1:1 relationship between media blocks and source media clients that serve any particular client device 108.

Referring now to FIG. 3B, once the peer-to-peer connections are established, the client device 108 can start downloading media blocks from each source client device 110-114. Through an individual peer-to-peer connection, each source client device can parallel-transmit media blocks to the client device 108. The client device 108 may receive the media blocks from the source client devices 110-114 and, with the received media blocks, construct a portion of the instance of media content suitable for a playback. In one embodiment, as described above, each stripe of media blocks (e.g., a parity group of media blocks) has redundant blocks for a recovery of late-arriving, missing or defective data in the stripe of media blocks. The client device 108 may construct a playable portion of the instance of media content after the minimum number of blocks needed to recreate one stripe of media blocks is received. Thus, the receiving client device 108 does not generally need to wait for all media blocks in a stripe to be received before reconstructing the stripe of media content. However, if any defective blocks are discovered, late delivered media blocks can be used to recover the stripe of media content utilizing the redundancies. Subsequently, the client device 108 may play the constructed portion of the instance of media content. It is to be understood that the client device 108 can receive the next stripe of media blocks while playing a portion of the instance of media content in order to provide a continuous play of the instance of media content. Further, each source client device may have a different speed for transmitting media blocks to the client device. The client device may download media blocks as much as possible ahead of time but construct a portion of the instance of media content upon receipt of each stripe of media blocks.

Figure 4:
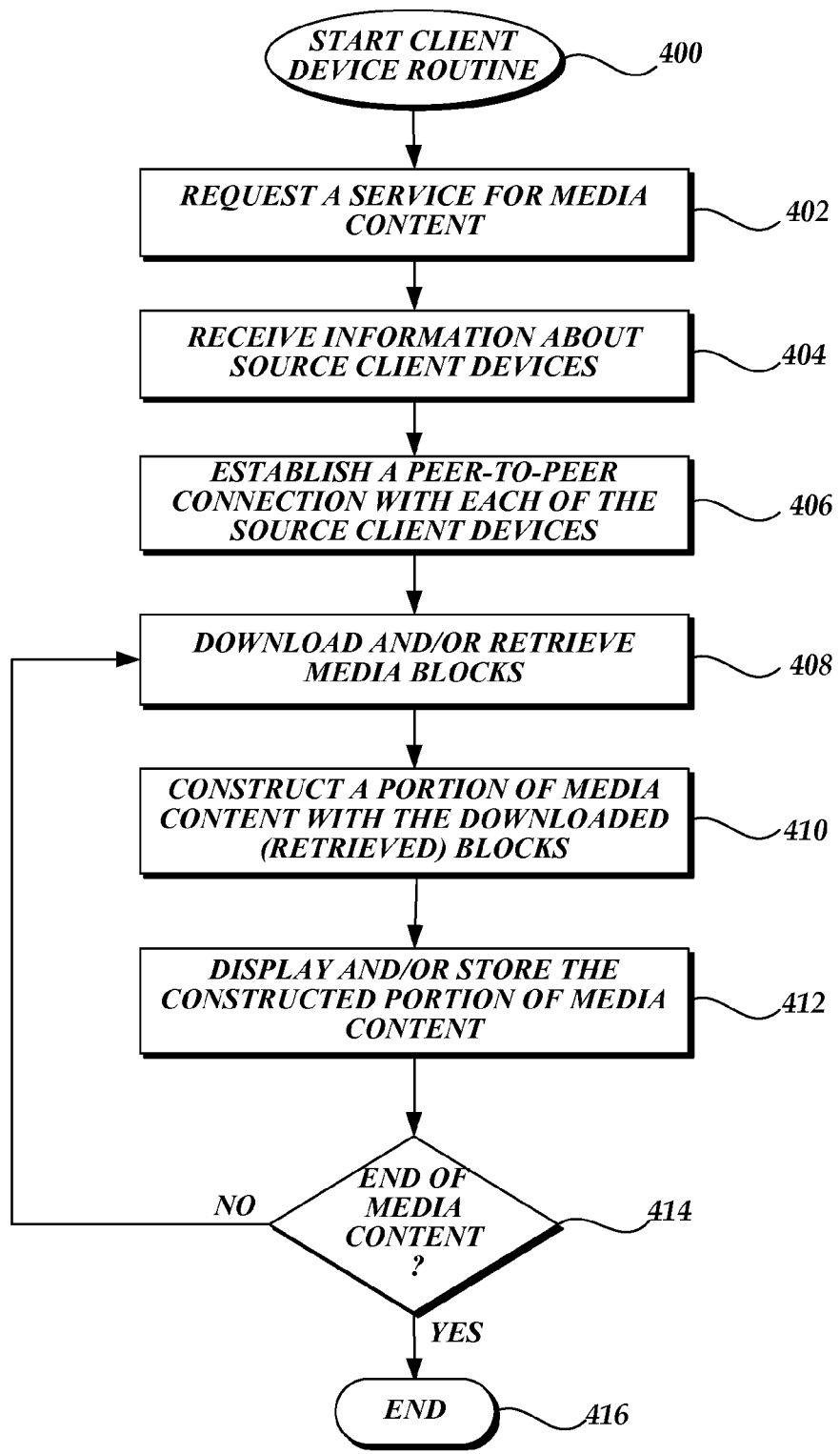
FIG. 4 is a flow diagram illustrating a client device routine for streaming an instance of media content from several source client devices in accordance with an aspect of the present invention.

Referring now to FIG. 4, a flow diagram 400 illustrative of a client device routine for streaming an instance of media content from several source client devices in accordance with an embodiment of the present invention will be described. Beginning with block 402, a client device of a user transmits to a service server 104 a request for streaming or downloading an instance of particular media content. The request can be transmitted from the client device via a communications network 106, such as the Internet. The service server 104 obtains the request and then obtains information about the client device, for example, a geographical location of the client device, a network location of the client device, etc. The service server 104 looks up an index table related to the requested instance of media content and selects a group of source client devices which can efficiently facilitate the request from the client device. In one embodiment, the service server 104 may select a group of source client devices that are geographically located close to the client device and have media blocks that can be utilized to fulfill the request. In some instances, the most closely located source client devices may be overburdened from providing several services to other client devices. In that case, the server may select a group of source clients which are less burdened even if the selected source client devices are located farther from the client device. In another embodiment, the server may choose a group that can most effectively facilitate the request from the client device based on various factors including, but not limited to, geographic and network topology information.

At block 404, the client device may receive information about the selected group of source client devices from which the client device can receive the requested instance of media content. In response to the request, the service server 104 transmits to the client device the information about the selected group of source clients, such as an IP address of each source client device, the media block distribution information (e.g., a distribution map, index table, etc.) among the source client devices, etc. The information about the selected group of source clients can be transmitted via a communications network 106. At block 408, the client device 108 establishes a peer-to-peer connection with each source client device from the selected group.

Through established peer-to-peer connections, the client device can start receiving media blocks from the source client devices as illustrated at block 408. The client device can receive the media blocks from the source client devices in a parallel fashion since each source client device is connected with the client device via a separate peer-to-peer connection channel. If the client device is one of the selected source client devices, the media blocks may be simply obtained from a cache component of the client device.

At block 410, the client device may construct (produce) a portion of the instance of media content from a part of the downloaded media blocks. As mentioned above, the construction may be done per stripe of media blocks. A stripe of media blocks and corresponding redundant blocks may be defined at the time of the distribution. The client device may construct a portion of the instance of media content after the minimum number of media blocks that are needed to construct the at least one stripe of media blocks is received. During the construction, if any defective data in the media blocks has been received, the stripe of media content may be recovered using one or more additional blocks (e.g., blocks received after the first minimum number of blocks) received from source clients. It is to be understood that there are various ways to generate redundant blocks for a stripe of data blocks, but in some embodiments, parity information may be transmitted to the receiving client that enables the receiving client to recreate the stripe of media content from only a subset of the total media blocks in a particular stripe.

Under RAID level 6, the client device receives a stripe of media blocks that includes two independent redundant blocks corresponding to the stripe of media blocks so that even if any two of the source client devices are late in delivering their respective blocks or are not available for providing media blocks, the portion of the instance of media content can be correctly constructed using the blocks received from the other source client devices. At block 412, the client device may playback the constructed portion of the instance of media content. Alternatively, the client device may store the constructed portion of the instance of media content for later playback. It is to be understood that, in order to prepare next portion of the media content, the client device can receive the next stripe of media blocks while playing some portions of the instance of media content.

At decision block 414, there is a determination as to whether the client device received all media blocks for the entire instance of media content. If it is determined that the client device needs to receive more media blocks from the source client devices, the routine 400 returns back to block 408 and continues. The routine 400 repeats the above-mentioned process until the client device receives media blocks for the entire instance of media content. However, if it is determined at decision block 414 that the client device has received media blocks for the entire instance of media content, the routine 400 completes at block 416.

Figure 5:
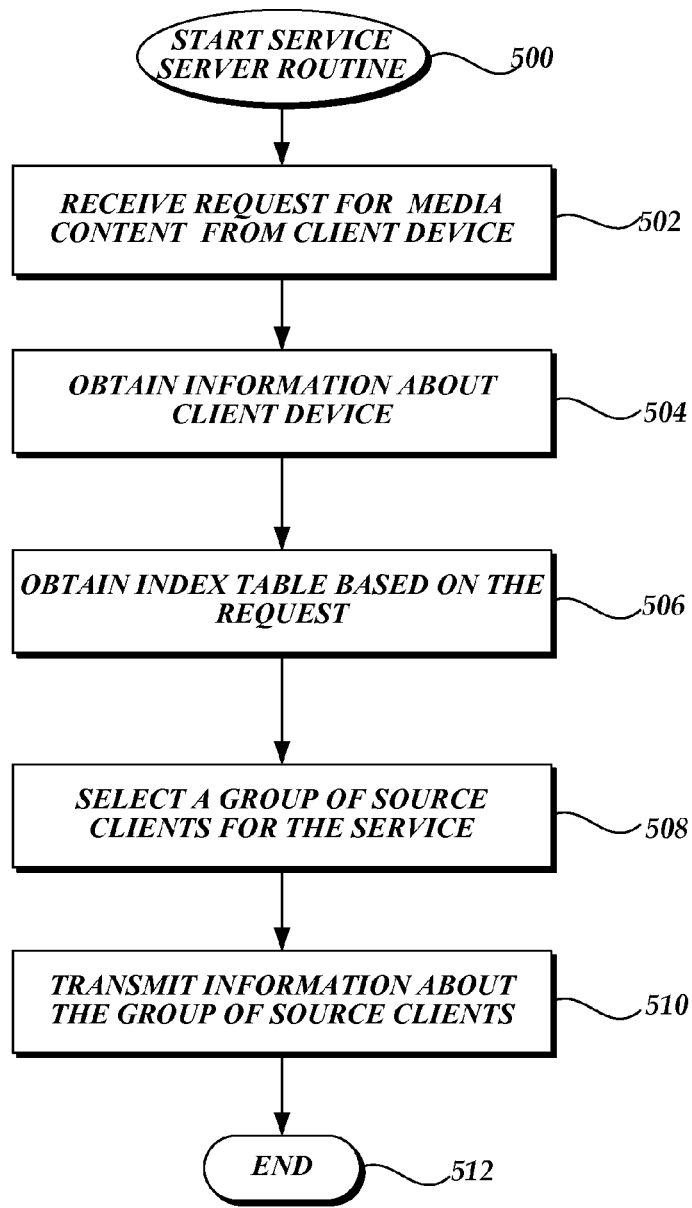
FIG. 5 is a flow diagram illustrating a service server routine for providing services by enabling a client device to receive an instance of media content from several source client devices in accordance with an aspect of the present invention.

With reference to FIG. 5, a flow diagram 500 illustrative of a service server routine for providing services by enabling a client device to receive instances of media content from several source client devices in accordance with an embodiment of the present invention is described.

At block 502, the service server 104 receives from a client device a request for an instance of media content. As described above, some instances of media content may have been distributed in the form of media blocks amongst source client devices. One group of source client devices may be implemented as a small scale edge cache server configured to fulfill the request for users. Each source client device includes a cache memory component where the service server 104 can write or update media blocks of several different instances of media content. From the user's point of view, a source client device may not be different from any other client device because the source client device can be used by the user to navigate a media content catalog and/or to receive media content over the Internet. It is to be noted that the transmitting of media blocks from a source client device to other client devices is transparent to a user who operates the source client device.

At block 504 the service server 104 may obtain information about the client device. The service server 104 may get profile information about the client device to obtain the physical address or network address of the client device. In one embodiment, the service server requires the profile information at the time of a user subscription with the service server. At block 506, the service server 104 obtains index tables which include information about which group of source client devices can provide an efficient service to the client device and which contain media blocks that can be used to fulfill the request. As mentioned above, the source client devices may be grouped for facilitating a request for an instance of particular media content based on, among other considerations, a geographic locality or other logical grouping. Typically, a subset of media content can be served by one group of source client devices. In one embodiment, the source client devices may be grouped by other factors, such as an encoding format, size, category, etc., of the instances of media content. For example, one group is designated to store media blocks for audio content while another group is designated to store media blocks for video content. The service server 104 may determine which group of source client devices can serve which media content, which group of source client devices can effectively serve which geographic area, and the like.

At block 508, the service server 104 selects a group of source client devices for serving the requested service based on the obtained index tables and other relevant information. The selected group stores media blocks which are utilized to fulfill the requested service. At block 510, the service server 104 provides the client device with the information about the selected group of source client devices. In one embodiment, the service server 104 may verify the user (or the client device) for each requested service and transmit verification (or authorization) to download the requested instance of media content from the selected group of source client device to the client device. In an alternative embodiment, the client device may receive from the service server an authorization which can be used for a fixed number of services or for services during a fixed time period. For example, a user can purchase a fixed number of services up front and receives an authorization that is good for that fixed number of services. In those embodiments, the peer-to-peer connection can be established with a source client device only if the client device provides verification or an authorization to download the requested instance of media content. In this manner, the network security can be well maintained. The routine 500 completes at block 514.

Figure 6:
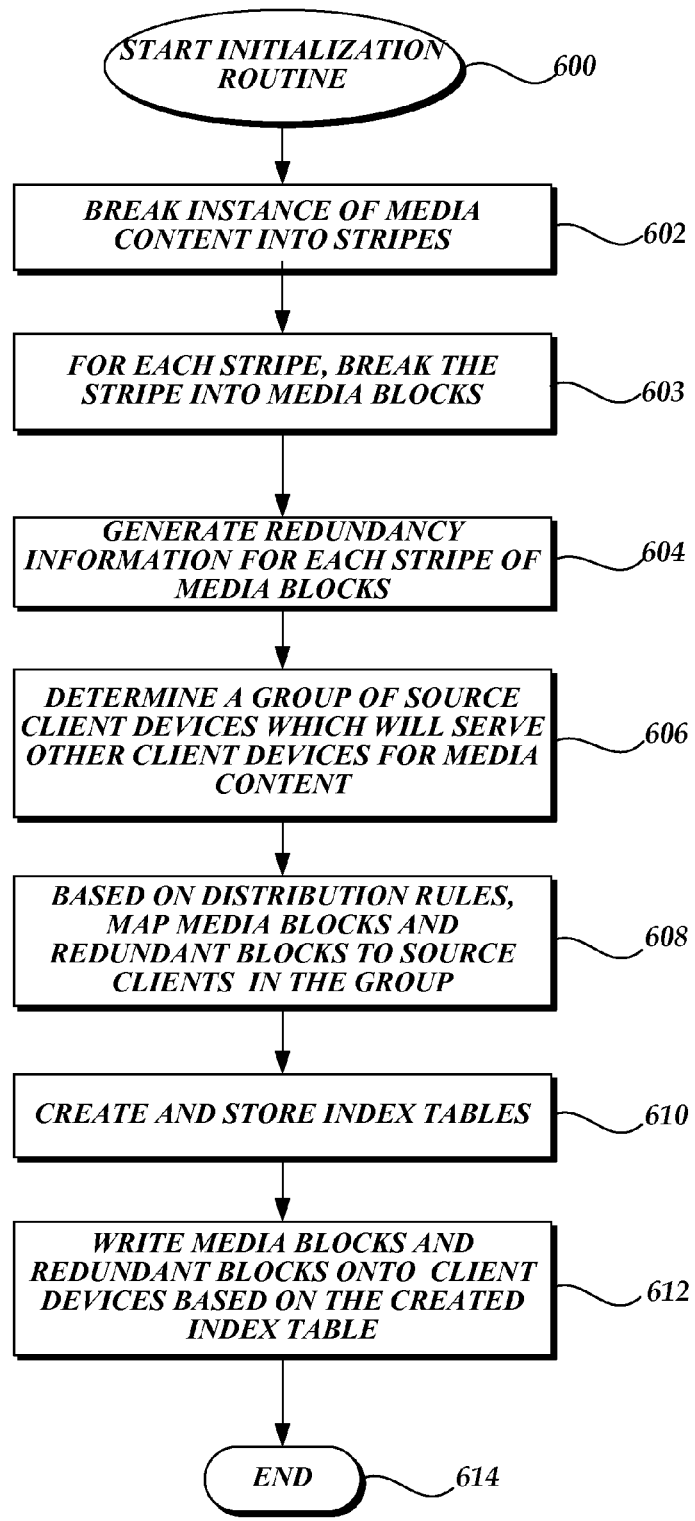
FIG. 6 is a flow diagram illustrating a media content initialization routine for distributing media blocks of an instance of media content amongst several source client devices in accordance with an aspect of the present invention.

With reference to FIG. 6, a flow diagram 600 illustrative of an instance of media content initialization routine for distributing media blocks of instances of media content amongst several source client devices in accordance with an aspect of the present invention will be described.

At block 602, an instance of media content may be divided or segmented into N stripes. At block 603, each stripe may be divided into several media blocks, for example, four media blocks, for distribution among source client devices. A media block may differ in size between different implementations. One of ordinary skill in the art would appreciate that the size of the media block can be configured to be small enough in order to avoid congestion or latency problems. The level of implemented RAID, the number of source client devices per group, and other information may also be used to determine the number of media blocks to be divided. As with FIGS. 4 and 5, assume that RAID level 6 may be implemented in exemplary embodiments described herein. However, in alternative embodiments, other RAID levels may be utilized.

Figure 7:
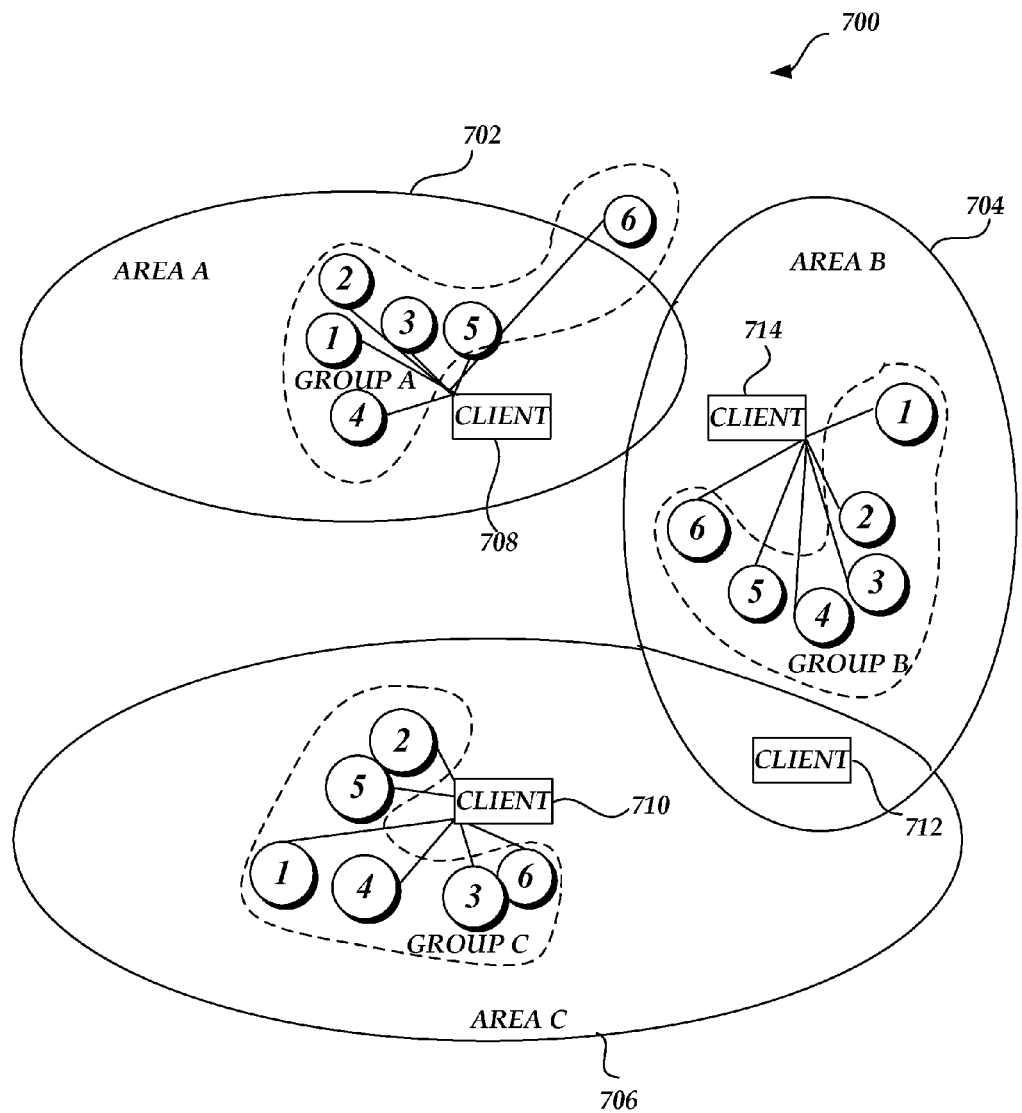
FIG. 7 is a pictorial diagram illustrating a group of source client devices serving a client located in a corresponding area in accordance with an aspect of the present invention.

At block 604, redundancy information may be generated for each stripe of media blocks (e.g., a group of media blocks defined by particular RAID level). In an illustrative embodiment, parity information is generated such that any two of the four blocks received can be used to generate the entire stripe of media content. At block 606, a group of source client devices may be selected for facilitating a service to provide the instance of media content to other client devices based on their geographic locality, network topology, network congestion, or client utilization, among other considerations. Referring to FIG. 7, a pictorial diagram 700 of several groups of source client devices for serving corresponding areas is depicted. Assume a scenario where the users of the service server 104 may be located in three areas, for example, "AREA-A" 702, "AREA-B" 704, and "AREA-C" 706. When the service server distributes media blocks of an instance of media content, the service server (not shown) may determine a group of source client devices for serving each area. As shown in FIG. 7, three groups of source client devices, "GROUP-A" for "AREA-A" 702, "GROUP-B" for "AREA-B" 704, and "GROUP-C" for "AREA-C" 706, are selected by the service server for distribution. In this example, if a client device 708 requesting the instance of media content is located in "AREA-A" 702, the client device may be directed to access the source client devices of "GROUP-A" for the requested instance of media content. Similarly, if a client device 714 requesting an instance of media content is located in "AREA-B" 704, the client device 714 may be directed to access the source client devices of "GROUP-B" for the requested instance of media content. In some instances, a client device may be associated with multiple groups. For example, assume that a client device is located in between "AREA-B" 704 and "AREA-C" 706. In that example, the service server 104 may select "GROUP-B," "GROUP-C," or both, for the client. It is understood that the geographic locality is one of many factors that the service server can use to define source client devices into several groups. For example, other relevant information, such as potential load on source client devices, may be considered when the service server 104 determines a group of source client devices for the client device.

Referring back to FIG. 6, at block 608, the service server 104 may map the media blocks and the redundant blocks to source client devices in each group based on some distribution rules. The distribution rules may specify what level of RAID to be implemented, the number of source client devices per group, etc. At block 610, the service server 104 may create index tables reflecting the mapping information and store the created index tables in local memory. When a client device requests for an instance of media content, the service server may make a reference to the index tables to identify a group of source client devices for fulfilling the request.

At block 612, the service server 104 may distribute the media blocks and the redundant blocks to each group of source client devices in accord with the index tables. As mentioned above, the distribution of media blocks can be done at once (multicasted) for each group, or gradually done based on the demand of end-users in the geographic locality. Thus, if an instance of particular media content is predicted to be more popular in one area, media blocks of that particular media content may be first distributed among source client devices that are most likely to serve the area. Also, if some instances of media content are predicted not to be popular but there may be a demand, a few selected groups of source client devices may be selected to store media blocks of such instances of media content. Continuing with the above-mentioned example, in FIG. 7, assume that media blocks of a less popular instance of media content are distributed only among a particular group of source client devices, for example, "GROUP-A." In this example, "GROUP-A" will serve users in "AREA-A" 702, "AREA-B" 704, and "AREA-C" 706 by providing of the instance of less popular media content.

Once the media blocks of the instance of media content are distributed among at least one group of source client devices as illustrated at block 612, a client device can receive the media blocks directly from the group of source client devices. The routine 600 completes at block 614.

Accordingly, systems and methods using fractional redundant distribution of media content has been described that can, among other benefits, reduce latency in media delivery. For the Internet to become a viable alternative to media delivered to the home from broadband cable and satellite, users preferably should be able to change media sources quickly. Latencies in excess of several seconds degrade the user experience and can make it impractical for users to browse for content. The total latency of the system is determined by the time data can be reliably delivered. The statistical probability that a packet can be delivered within a certain period of time is improved through the data redundancy approaches described herein. That is, by using the first received of the minimum number of blocks to reconstruct each stripe of media content, the system does not need to wait for the slowest blocks to arrive. Because any of the source clients, or the networks between the source and receiving client, may be overloaded or experience congestion the described approach can increase the probability that the received blocks can be used to recreate the respective stripe of media content under a desired latency threshold.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method comprising:
   transmitting, by a user device, a request to a media distribution system for downloading an instance of media content, wherein the request includes an indication of a user device location associated with the user device;
   receiving, by the user device, information about a plurality of source user devices,
      wherein the plurality of source user devices includes at least one group of source user devices associated with a location,
      wherein each source user device in the plurality of source user devices has been provided with at least one portion of the instance of media content by the media distribution system based at least in part on a location associated with the source user device such that at least one group of source user devices in the plurality of source user devices collectively contains the instance of media content, and wherein the plurality of source user devices is organized according to location criteria;

establishing at least one peer-to-peer communication connection with two or more source user devices in the plurality of source user devices organized according to the location criteria;

upon establishment of the peer-to-peer communication connection, transmitting a subset of portions of the instance of the media content from the two or more source user devices, wherein the subset of portions of the instance of the media content is less than all of the portions of the instance of the media content that comprises the media content; and using the transmitted subset of portions of the instance of the media content to recreate the instance of media content.

2. The computer-implemented method of claim 1, wherein the transmitted subset of portions of the instance of the media content comprises a parity group of media blocks.

3. The computer-implemented method of claim 2 further comprising recreating a portion of the instance of media content corresponding to missing media blocks based at least in part on the parity group of media blocks.

4. The computer-implemented method of claim 2 further comprising recreating a portion of the instance of media content corresponding to defective media blocks based at least in part on the parity group of media blocks.

5. The computer-implemented method of claim 1 further comprising performing a parity check to determine whether a portion from the transmitted subset of portions is corrupt.

6. The computer-implemented method of claim 1 further comprising receiving from the media distribution system an authorization to access the plurality of source user devices.

7. The computer-implemented method of claim 6, wherein establishing the at least one peer-to-peer communication connection with the two or more source user devices comprises transmitting the received authorization to the two or more source user devices.

8. The computer-implemented method of claim 1, wherein the plurality of source user devices is selected from a set of source user devices based at least in part on load balancing criteria.

9. The computer-implemented method of claim 1, wherein the user device location comprises one of a geographic location and a network location.

10. The computer-implemented method of claim 1, wherein the location criteria is based at least in part on one of a geographic location and a network location.

11. The computer-implemented method of claim 1, wherein the location criteria is based at least in part on the user device location.

12. A system for distributing media content, the system comprising:

a user device comprising computer hardware, the user device configured to:

transmit to a media distribution system a request to transfer an instance of media content, wherein the request includes an indication of a user device location associated with the user device;

receive from the media distribution system information about a plurality of source user devices, wherein the plurality of source user devices includes at least one group of source user devices associated with the user device location, wherein each source user device in the plurality of source user devices has been provided with at least one portion of the instance of media content by the media distribution system based at least in part on a location associated with the source user device such that at least one group of source user devices in the plurality of source user devices collectively includes the instance of media content, and wherein the plurality of source user devices is organized according to location information;

establish at least one communication connection with a number of source user devices in the plurality of source user devices based at least in part on the organization according to location information;

transfer, upon establishment of the communication connection, a subset of portions of the instance of the media content from the number of source user devices, wherein the subset of portions of the instance of the media content is less than all of the portions of the instance of the media content that comprises the media content; and recreate the instance of media content using the transferred subset of portions of the instance of the media content.

13. The system of claim 12, wherein the transferred subset of portions of the instance of the media content comprises a parity group of media blocks.

14. The system of claim 13, wherein the user device is further configured to recreate a portion of the instance of media content corresponding to one of missing media blocks, defective media blocks, and delayed media blocks based at least in part on the parity group of media blocks.

15. The system of claim 12, wherein the user device is further configured to perform a parity check to determine whether a portion from the downloaded subset of portions is corrupt.

16. The system of claim 12, wherein the user device is further configured to receive from the media distribution system an authorization to access the plurality of source user devices and to transmit the received authorization to the number of source user devices.

17. The system of claim 12, wherein the plurality of source user devices is selected from a set of source user devices based at least in part on load balancing criteria.

18. The system of claim 12, wherein the user device location comprises one of a geographic location and a network location.

19. Non-transitory physical computer storage comprising instructions stored thereon that, when executed by one or more processors, perform operations comprising:

receiving from a media distribution system information about a plurality of source devices configured to transmit at least a portion of an instance of media content, wherein the plurality of source devices includes at least one group of source devices associated with a destination device location, wherein each source device in the plurality of source devices has been provided with at least one portion of the instance of media content by the media distribution system based at least in part on a location associated with the source device such that at least one group of source devices in the plurality of source devices collectively includes the instance of media content;

establishing at least one communication connection with a number of source devices in the plurality of source devices based at least in part on organization information;

transmitting, upon establishment of the communication connection, a subset of portions of the instance of the media content from the number of source user devices, wherein the subset of portions of the instance of the media content is less than all of the portions of the instance of the media content that comprises the media content; and recreating the instance of media content using the transmitted subset of portions of the instance of the media content.

20. The non-transitory physical computer storage of claim 19, wherein the transmitted subset of portions of the instance of the media content comprise parity information and wherein the destination device is further configured to recreate a portion of the instance of media content corresponding to one of missing media blocks, defective media blocks, and delayed media blocks based at least in part on the parity information.

21. The non-transitory physical computer storage of claim 19, wherein the operations further comprise receiving from the media distribution system an authorization to access the plurality of source devices and to transmit the received authorization to the number of source devices.

22. The non-transitory physical computer storage of claim 19, wherein the destination device location comprises one of a geographic location and a network location.

* * * * *